Dec. 8, 1959 L. E. LEAVITT 2,916,683
INDUCTION MOTOR REVERSER
Filed April 28, 1959

INVENTOR
LIONEL E. LEAVITT
BY
ATTORNEYS

2,916,683

INDUCTION MOTOR REVERSER

Lionel Eugene Leavitt, Flushing, N.Y., assignor to Sperry Rand Corporation, Ford Instrument Company Division, Wilmington, Del., a corporation of Delaware Application April 28, 1959, Serial No. 809,397

3 Claims. (Cl. 318—207)

This invention relates to a motor reversing circuit and particularly to a three-phase circuit which serves to control a three-phase induction motor.

In general, the invention contemplates the provision of a motor reversing circuit which comprises a pair of capacitors and saturable core reactors having disposed on each reactor a pair of line windings and a control winding. It is the function of the control circuits to maintain the core reactors selectively in an unsaturated or saturated condition, it having been found in theory and practice that where the windings are poled in a particular manner relative to each other the circuit can cause the induction motor disposed on the load side thereof to be energized when one or the other of the core reactors has been saturated and the impedance of its gate coils have been reduced to zero. Additionally, it was found that the direction of motor drive is dependent on the reactor which has been saturated so that the motor can easily be reversed in direction by desaturating the saturated core and saturating the unsaturated core by means of the control circuits. More specifically a pair of branch connections and core reactors are provided between two of the phase lines and each branch connection is provided with a pair of oppositely poled windings wound separately on the reactors and a capacitor. The capacitor in each connection serves to limit what would otherwise be an extremely high current due to the removal of reactance in the circuits by reason of the polarity of the windings and also to provide proper phase and voltage magnitudes at the motor windings.

One object of the invention is to provide an improved motor reversing circuit for a three-phase motor.

Another further object of the invention is to provide an improved motor stopping circuit for a three-phase motor.

A still further object of the invention is to provide an improved motor controlling means, for a three-phase motor, where no moving parts are employed.

Other objects and advantages of the invention may be appreciated on reading the following detailed description of the circuit which is taken in conjunction with the drawings, in which.

Figure 1:
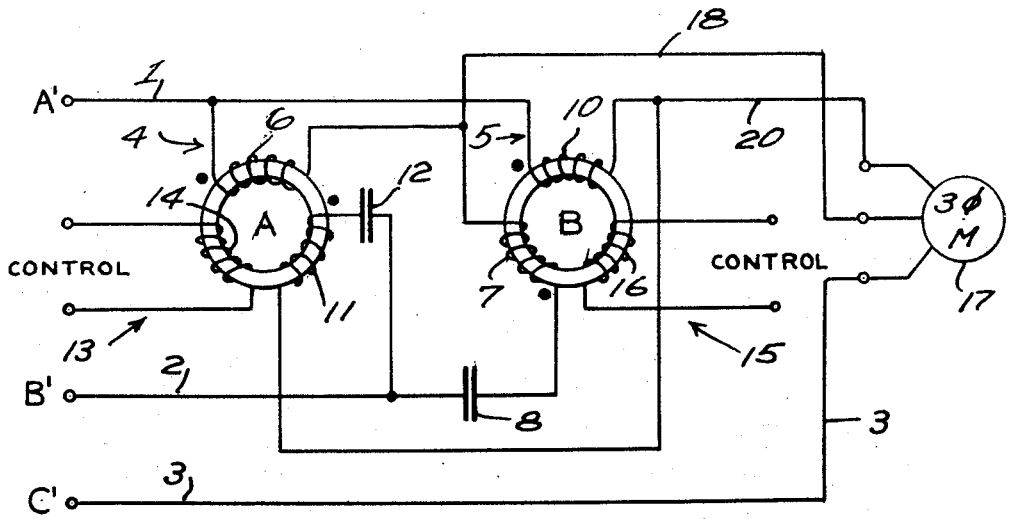
Fig. 1 is a schematic of the motor reversing circuit.

Referring to Fig. 1, there is provided a three-phase supply having terminals A', B' and C'. Connected to the treminal A' is phase line 1 which is connected to the phase line 2 by means of branch circuits 4 and 5. There is provided in series connection in the branch 4 a winding 6, wound on saturable core reactor A and a winding 7 which is poled oppositely to the winding 6 and is disposed on core reactor B and a capacitor 8, while in the branch circuit 5 there is provided in series connection a winding 10 wound on the core reactor B, a winding 11 which is poled oppositely to the winding 10 and is wound on the saturable core reactor A and a capacitor 12. A control circuit 13 having a control winding 14 on the reactor A is provided to determine the state of saturation of that reactor and control circuit 15 having a control winding 16 serves to place selectively the core reactor B in a saturated or unsaturated state.

A three-phase induction motor 17 has two of its phase terminals connected across the branches. To this end one of the phase terminals is connected to the branch lead 4 between the windings 6 and 7 by means of the connection 18 and the second phase terminal of the motor 17 is connected by means of the connection 20 to the branch lead 5 at a point between the winding 10 on the reactor B and the oppositely poled winding 11 on the reactor A. The third terminal of the three-phase motor 17 is connected by phase line 3 to the terminal C' of the three-phase supply.

Figure 2:
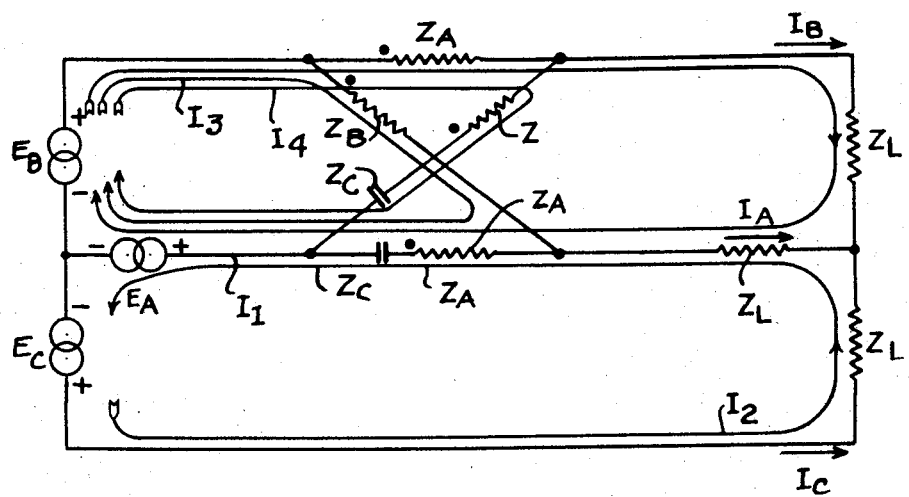
Fig. 2 is a linear equivalent model of the reversing circuit shown schematically in Fig. 1.

The circuit which is described above may be analyzed in terms of its linear equivalent model shown in Fig. 2. Analyzing this model, with the motor at starting, the only approximations made are that of an infinite control circuit impedance and unity coupling between the line phase windings on the reactors.

The analysis of the model circuit shown in Fig. 2 will yield four independent simultaneous equations which are set forth as follows:

(1) $E_B - E_A = (2Z_L + Z_C)I_1 + (Z_L + Z_C)I_2 + Z_C I_3 + 0 I_4$
(2) $E_C - E_A = (Z_C + Z_L)I_1 + (Z_C + Z_A + 2Z_L)I_2 + (Z_C + Z_A)I_3 - Z_A I_4$
(3) $E_B - E_A = Z_C I_1 + (Z_C + Z_A)I_2 + (Z_B + Z_A + Z_C)I_3 - (Z_A + Z_B)I_4$
(4) $E_B - E_A = 0 I_1 - Z_A I_2 - (Z_A + Z_B)I_3 + (Z_C + Z_B + Z_A)I_4$ where $E_A$, $E_B$ and $E_C$ are phase voltages of the supply, $Z_A$ is the impedance of a coil on reactor A, $Z_B$ is the impedance of a coil on reactor B and $Z_C$ is the impedance of the capacitors in the circuit and $Z_L$ is the impedance per phase of the three-phase motor and $I_1$, $I_2$, $I_3$ and $I_4$ are currents in the model circuit which follow the paths indicated by the arrows. Since $I_1$ equals $I_B$, $I_2$ equals $I_C$ and $-(I_1+I_2)$ equals $I_A$ only two solutions of the simultaneous equations are necessary to describe the three-phase system. These solutions may be set forth in equation form as follows:

(5) $I_1 = I_B = \dfrac{(E_B - E_C)[Z_L(2Z_A + Z_C) + Z_B(2Z_L + Z_C)]}{Z_L[Z_L(2Z_A + 3Z_C) + Z_B(2Z_A + 4Z_L + Z_C)] + (2Z_L + Z_C)[Z_A Z_B + Z_B Z_L + 2Z_A Z_L]}$ (6) $I_2 = I_C = \dfrac{(E_C - E_B)[Z_A(4Z_L + Z_C) + Z_B(4Z_L + Z_C)]}{Z_L[Z_L(2Z_A + 3Z_C) + Z_B(2Z_A + 4Z_L + Z_C)] + (2Z_L + Z_C)[Z_A Z_B + Z_B Z_L + 2Z_A Z_L]}$ Using Equations 5 and 6, a two-mode system of circuit operation may be described. In mode I, it is assumed that both core reactors are unsaturated and that $Z_A$ and $Z_B$ are high impedances relative to the impedances of the capacitors or the motor. Further, it is assumed that $Z_A$ is equal to $Z_B$ since the reactors and their phase windings can be made the same. On the basis of these assumptions a solution of the Equations 5 and 6 yields the following formulae determining the currents in the equivalent circuit model.

(7) $I_1 = I_B = \dfrac{(E_B - E_C)}{Z_A}$ (8) $I_2 = I_C = \dfrac{2(E_C - E_B)}{Z_A}$ (9) $I_A = -(I_1 + I_2) = \dfrac{(E_B - E_C)}{Z_A}$ Due to the assumption that $Z_A$ is large it is seen that the phase currents will be small and circuit parameters may be easily selected so that currents will, in fact, be too small to operate the motor when both core reactors are unsaturated. Also, if it is assumed that the core reactors A and B have virtually pure inductive reactance, the currents will not have the 120° phase difference required to operate the motor. Thus, it is seen that the motor can be kept inoperative where the reactors are unsaturated and their reactances are considerably larger than the other parameters—a condition which is easily achieved by the proper selection of reactors and phase windings.

In the operation of mode II, it is assumed that one core reactor is saturated which may be either reactor A or reactor B. Two cases will be treated within this second mode: (a) reactor A is saturated so that $Z_A$ is equal to 0 and (b) reactor B is saturated so that $Z_B$ is equal to 0. For this mode of operation, the assumptions made for mode I are still valid, namely $Z_A$ or $Z_B$ is larger than $Z_C$ or $Z_L$ when one core is unsaturated. Also it is assumed that there is no residual inductance when one of the cores is saturated.

(a) Because $Z_A$ is equal to 0 Equations 5 and 6 yield

(10) $$I_1 = I_B' = \frac{(E_B - E_C)(2Z_L + Z_C)}{2Z_L(3Z_L + Z_C)}$$

(11) $$I_2 = I_C' = \frac{(E_C - E_B)(4Z_L + Z_C)}{2Z_L(3Z_L + Z_C)}$$

(12) $$I_A' = -(I_1 + I_2) = \frac{E_B - E_C}{3Z_L + Z_C}$$

(b) Because $Z_B$ is equal to 0 Equations 5 and 6 yield

(13) $$I_1 = I_B'' \frac{E_B - E_C}{3Z_L + Z_C}$$

(14) $$I_2 = I_C'' = \frac{(E_C - E_B)(4Z_L + Z_C)}{2Z_L(3Z_L + Z_C)}$$

(15) $$I_A'' = -(I_1 + I_2) = \frac{(E_B - E_C)(2Z_L + Z_C)}{2Z_L(3Z_L + Z_C)}$$

where $I_A'$, $I_B'$ and $I_C'$ are the phase currents in the motor windings after saturation of the reactor A, and $I_A''$, $I_B''$ and $I_C''$ are phase currents in the motor windings after saturation of the reactor B. Comparing the results of the equations in (a) and (b) it is seen that $I_B' = I_A''$, $I_A' = I_B''$ and $I_C' = I_C''$. That the current in one of the motor windings while one core is saturated is equal to the current in another motor winding while the other core is saturated affords a strong indication that the phase sequence in the motor windings is dependent on the identity of the reactor which is saturated and that reversal of the phase sequences can be effected by changing the state of saturation in the core reactors. With the equations derived in mode II, it is apparent that it is possible to choose a capacitance to satisfy the condition of motor starting and reversing if there is known motor load. By using the Equations 10–12, for example, the phase currents including their magnitudes and phase angles may be plotted separately against different values of capacitance. Employing this empirical procedure it was found, using a typical motor having an impedance value of $Z_L = 185 + j313$, that an optimum value of capacitance exists where its value is equal to about .36 mf. For this capacitance, the various phase currents are at the following magnitudes and phase:

$$I_A = .184 \angle 28°$$
$$I_B = .120 \angle -92°$$
$$I_C = .188 \angle 148°$$

Three-phase induction motors are available on the market which are operable on phase currents of these magnitudes. It is noted that the currents are almost approximately 120° apart which is a necessary condition for this type of motor.

Various modifications of the motor triggering and reversing circuit as above described may be effected by persons skilled in the art without departing from the principal and scope of invention as defined in the following claims.

What is claimed is:

1. A three-phase induction motor circuit comprising a three-phase motor having three terminals, a three-phase supply having three terminals, a phase line connecting directly one of the supply terminals to one of the motor terminals, a second phase line and a third phase line connected to said supply terminals, a pair of branch leads connecting said second phase line to the third phase line, a pair of core reactors, each of said branch leads having a capacitor and a pair of oppositely poled windings with one of said windings being wound on one of said core reactors and the other of said windings being wound on the other core reactor, the other two terminals of said motor being connected across said branch leads.

2. A three-phase induction motor circuit as claimed in claim 1 wherein the means for connecting the two terminals of said three-phase motor across the branch leads comprises a conductor connecting one of said motor terminals to one branch lead between the windings disposed therein and a second conductor connecting another motor terminal to the second branch lead at a point between the windings disposed therein.

3. A three-phase induction motor circuit comprising a three-phase motor having three terminals, a three-phase supply having three terminals, a phase line connecting directly one of the supply terminals to one of the motor terminals, a second phase line and a third phase line connected to second and third terminals of said supply, a pair of core reactors, a first branch lead connecting said second phase line to said third phase line, said branch lead having a capacitor and a pair of oppositely poled windings disposed one on each of said core reactors, a second branch lead connecting said second phase line to said third phase line, said second branch lead having a capacitor and a pair of oppositely poled windings disposed one on each of said core reactors, a conductor connecting one of said motor terminals to said first branch lead between the windings disposed therein, a second conductor connecting another motor terminal to said second branch lead at a point between the windings disposed therein, a first control winding disposed on one of said core reactors and a second control winding disposed on the other of said core reactors.

No references cited.